United States Patent
Schmidt

(10) Patent No.: US 11,549,881 B2
(45) Date of Patent: Jan. 10, 2023

(54) HIGH EFFICIENCY OPTICAL DETECTION OF BIOMOLECULES IN MICRO-CAPILLARIES

(71) Applicant: The Regents of the University of California, Oakland, CA (US)

(72) Inventor: Holger Schmidt, Capitola, CA (US)

(73) Assignee: The Regents of the University of California, Oakland, CA (US)

( * ) Notice: Subject to any disclaimer, the term of this patent is extended or adjusted under 35 U.S.C. 154(b) by 675 days.

(21) Appl. No.: 16/486,797

(22) PCT Filed: Feb. 19, 2018

(86) PCT No.: PCT/US2018/018648
§ 371 (c)(1),
(2) Date: Aug. 16, 2019

(87) PCT Pub. No.: WO2018/152479
PCT Pub. Date: Aug. 23, 2018

(65) Prior Publication Data
US 2019/0360913 A1    Nov. 28, 2019

Related U.S. Application Data

(60) Provisional application No. 62/461,166, filed on Feb. 20, 2017.

(51) Int. Cl.
*G01N 15/14* (2006.01)
*G02B 6/032* (2006.01)
(Continued)

(52) U.S. Cl.
CPC ..... *G01N 15/1436* (2013.01); *G01N 15/1459* (2013.01); *G01N 15/1484* (2013.01);
(Continued)

(58) Field of Classification Search
None
See application file for complete search history.

(56) References Cited

U.S. PATENT DOCUMENTS 6,020,207 A    2/2000  Liu
7,343,074 B1   3/2008  Gallagher et al.
(Continued)

FOREIGN PATENT DOCUMENTS

JP    H04-070607 A    3/1992
JP    H07-027927 A    1/1995
(Continued)

OTHER PUBLICATIONS

Chien-Hsin, Chen et al, A Multi-D-Shaped Optical Fiber for Refractive Index Sensing, Sensors, vol. 10, No. 5, May 11, 2010, pp. 4794-4804, doi:10.3390/s100504794 (Year: 2010).*
(Continued)

*Primary Examiner* — Matthew D Krcha
*Assistant Examiner* — Brittany I Fisher
(74) *Attorney, Agent, or Firm* — Carter, DeLuca & Farrell LLP

(57) ABSTRACT

Disclosed herein are systems, methods, and techniques for optical detection of analytes (e.g., biomarkers or other objects) using a liquid-core waveguide in which the analytes are suspended in a high-index liquid inside a liquid channel of the waveguide. The term "high-index" may indicate a refractive core index of the carrier liquid that is higher than or equal to that of one or more surrounding cladding layer(s) (e.g., ethylene glycol liquid inside a glass channel). In some embodiments, a method includes illuminating, by a light-source, one or more particles in a liquid-core waveguide, wherein the liquid-core waveguide comprises a first cladding layer having a first index of a refraction, and a hollow core comprising a liquid inside the hollow core, wherein the
(Continued)

liquid has a second index of refraction higher than the first index of refraction; and detecting, by a detector, light emitted from the one or more particles.

23 Claims, 11 Drawing Sheets

(51) Int. Cl.
  *G01N 15/00* (2006.01)
  *G01N 21/64* (2006.01)
  *G01N 21/03* (2006.01)
  *G01N 21/05* (2006.01)

(52) U.S. Cl.
  CPC ..... *G02B 6/032* (2013.01); *G01N 2015/0053* (2013.01); *G02B 2006/0325* (2013.01)

(56) References Cited

U.S. PATENT DOCUMENTS

| | | | | |
|---|---|---|---|---|
| 2008/0057594 | A1* | 3/2008 | Fagan | G01N 21/7703 436/149 |
| 2009/0032730 | A1 | 2/2009 | Erickson et al. | |
| 2015/0260649 | A1* | 9/2015 | Nishio | G02B 6/10 385/12 |
| 2015/0268244 | A1* | 9/2015 | Cho | G01N 15/1429 435/7.23 |

FOREIGN PATENT DOCUMENTS

| | | |
|---|---|---|
| JP | 2004-529349 A | 9/2004 |
| JP | 2005-141009 A | 6/2005 |
| JP | 2008-536129 A | 9/2008 |
| JP | 2010-519557 A | 6/2010 |
| JP | 2013-088367 A | 5/2013 |
| JP | 2016-503489 A | 2/2016 |
| WO | WO 2002/088686 A1 | 11/2002 |
| WO | WO 2006/110749 A2 | 10/2006 |
| WO | WO 2014/062719 A2 | 4/2014 |
| WO | WO 2016/038015 A1 | 3/2016 |
| WO | WO 2016/038108 A1 | 3/2016 |

OTHER PUBLICATIONS

The European Examination Report dated Nov. 3, 2021 issued in corresponding EP Appln. No. 18 708 299.5.

Risk et al.; "Optical waveguides with an aqueous core and a low-index nanoporous cladding"; Optics Express; vol. 12; Dec. 2004; p. 6446-6455.

Yin et al.; "Integrated optical waveguides with liquid cores"; Applied Physics Letters; vol. 85; Oct. 2004; p. 3477-3479.

Chen et al.; "A Multi-D-Shaped Optical Fiber for Refractive Index Sensing"; Sensors; vol. 10; 2010; p. 4797-4804.

International Patent Application No. PCT/US2018/018648; Int'l Search Report and the Written Opinion; dated May 2, 2018; 16 pages.

\* cited by examiner

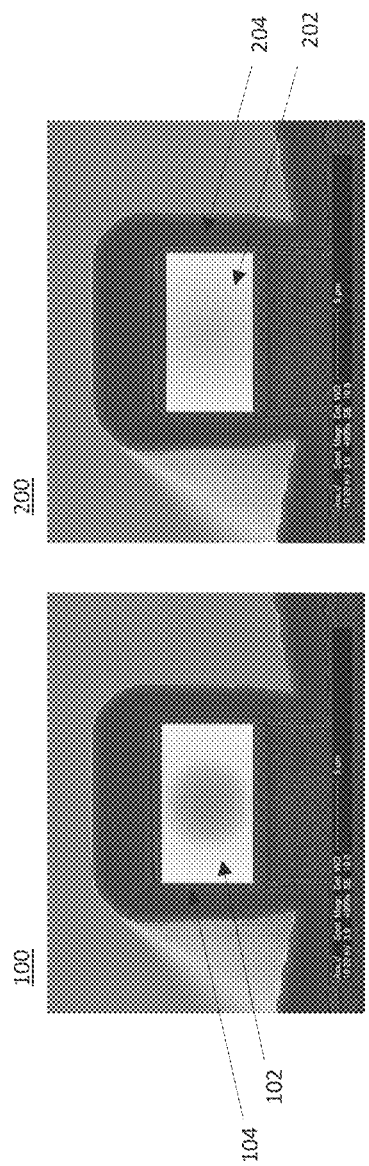
FIG. 1A
FIG. 2A
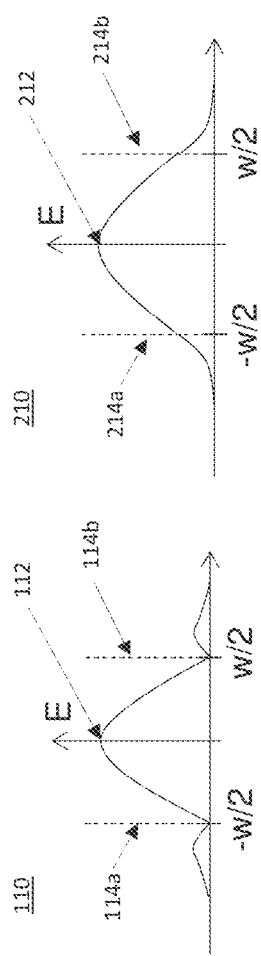
FIG. 1B
FIG. 2B

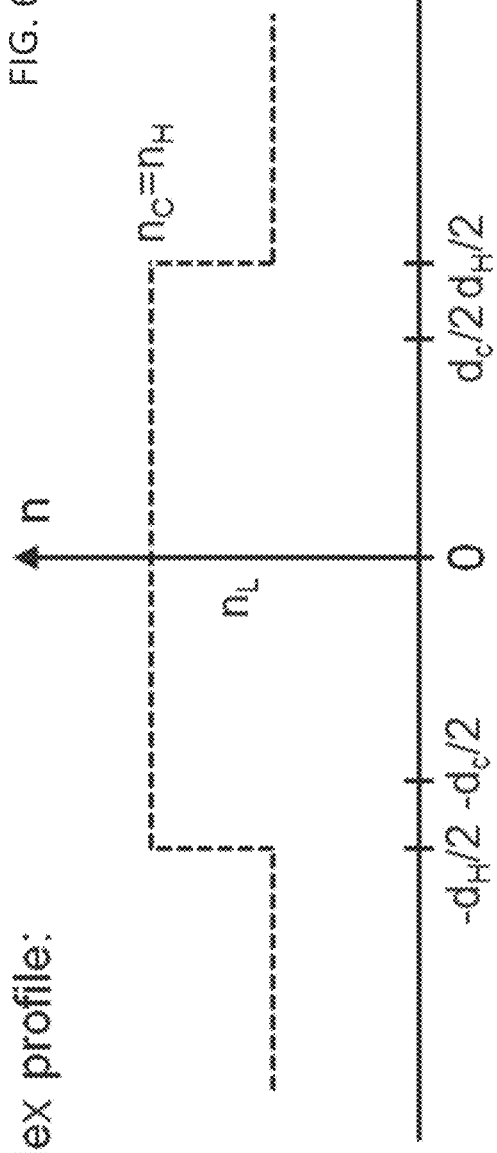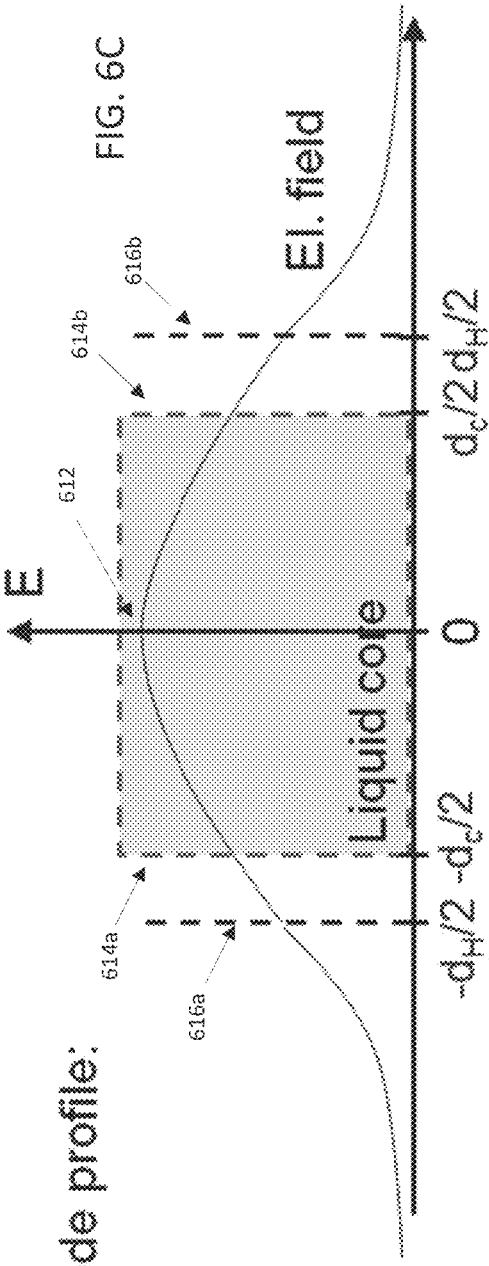

HIGH EFFICIENCY OPTICAL DETECTION OF BIOMOLECULES IN MICRO-CAPILLARIES

CROSS REFERENCE TO RELATED APPLICATIONS

This application is the U.S. National Stage of International Application No. PCT/US2018/018648, filed Feb. 19, 2018, titled "HIGH EFFICIENCY OPTICAL DETECTION OF BIOMOLECULES IN MICRO-CAPILLARIES," which claims priority to U.S. provisional patent application No. 62/461,166, filed Feb. 20, 2017, titled "METHOD FOR HIGH-EFFICIENCY OPTICAL DETECTION OF BIOMOLECULES IN MICRO-CAPILLARIES," which is hereby incorporated by reference in its entirety.

TECHNICAL FIELD

The present disclosure relates generally to optofluidics, and more particularly to capture and detection of generated light for optical detection of biomarkers and other objects.

BACKGROUND

One known method of optical detection of biological samples (e.g., molecules, particles, biomarkers, nucleic acids, proteins, etc.) is surface-based excitation/detection using evanescent fields from solid waveguides. Another known method is excitation/detection inside a microchannel/micro-capillary filled with water, saline, or a buffer solution containing the particles to be detected.

Another known solution is to use ARROW (antiresonant reflecting optical waveguides) or Bragg waveguides, which confine light in low-index materials by using wave interference from specially designed cladding layers. These waveguides have been shown to guide light through microchannels with low propagation loss, and can be interfaced with solid-core waveguides to enable sensitive detection of biomarkers down to the single nucleic acid level.

SUMMARY

As described above, known methods for optical detection of biological samples include surface-based excitation/detection using evanescent fields from solid waveguides; excitation/detection inside a microchannel/micro-capillary filled with water, saline, or a buffer solution; and use ARROW or Bragg waveguides to which confine light in low-index materials by using wave interference from specially designed cladding layers. However, all of these known methods have drawbacks.

For example, surface-based excitation/detection using evanescent fields from solid waveguides is extremely optically inefficient, requires target transport and binding to a surface, and has a very limited dynamic range. Excitation/detection inside a fluid-filled microchannel is difficult because biological liquids such as water, saline solutions, and buffer solutions, have a refractive index that is lower than that of solid-state materials that make up the channel.

Using ARROW or Bragg waveguides offers superior performance to the other methods described above, but has other drawbacks and limitations, including incomplete detection of the target molecules and analytes, and producing detection signal-to-noise ratio (SNR) close to the detector background, making it very challenging to detect targets that are labeled with only a single or few fluorescent dyes.

The main reason behind these limits lies in the nature of the leaky-mode waveguiding principle and is illustrated in FIGS. 1A and 1B. FIG. 1A shows a cross-sectional view of a liquid-core waveguide 100 wherein the index of refraction of the liquid-core 102 is lower than the index of refraction of the cladding 104. FIG. 1B shows the electric field profile 110 for a fundamental optical mode confined in a low-index medium of liquid-core waveguide 100 using ARROW/Bragg confinement.

As shown in FIG. 1B, the field decreases from a maximum 112 in the core center to exactly zero at the interfaces 114a and 114b with the cladding. Because the field is zero at the channel walls, particles in the low-index medium of liquid-core waveguide 100 that are located near the channel wall are excited and detected inefficiently, or are not excited or detected at all, as any fluorescence cannot couple into the waveguide mode. This effect can also be seen in the depiction of the mode in FIG. 1A, which shows that the brightest portion of the mode is confined to the center of liquid-core 102, and that the mode is very weak near the interfaces of liquid-core 102 and cladding 104. This results in a reduction of the detectable number of analyte particles in the digital detection regime, as only those particles located away from the walls of the liquid-core can be detected.

Secondly, leaky-mode waveguiding can occur with low, but always finite (e.g., non-zero) loss. This means that generated optical fluorescence or scattering signals can only be transported along the waveguide with finite efficiency. This further exacerbates the challenge of detecting particles close to the walls of a low-index medium liquid-core waveguide.

Thus, optical detection of biological samples (e.g., molecules, particles, biomarkers, nucleic acids, proteins, etc.) with high sensitivity on a chip using optical waveguides is difficult in accordance with known methods. Therefore, improved methods for optical detection of biological samples with high sensitivity on a chip using optical waveguides are needed. In particular, there is a need for methods that enable improved detection of the target molecules and analytes, particularly those particles located near channel walls of liquid-core waveguides, and that enable improved detection of targets that are labeled with only a single or few fluorescent dyes.

Disclosed herein are systems, methods, and techniques for improved optical detection of biomarkers and other objects using a liquid-core waveguide that may overcome the drawbacks of known methods discussed above and that may address the needs discussed above. The systems, methods, and techniques disclosed herein may enable improved capture of generated light and its transport to a photodetector.

In some embodiments, a liquid-core waveguide comprises a liquid core having a higher index of refraction than the index of refraction of the cladding. This may enable a fundamental optical mode to have a non-zero field strength at the interfaces between the liquid core and the cladding, and may therefore enable efficient excitation and detection of particles located proximate to the interfaces in the liquid core.

In some embodiments, a liquid-core waveguide comprises a liquid core, an inner cladding layer, and an outer cladding layer. By matching the index of refraction of the liquid core to the index of refraction of the inner cladding layer, and by selecting an outer cladding layer having a lower index of refraction than both the inner cladding layer and the liquid core, a fundamental optical mode may have a non-zero field strength at the interfaces between the liquid core and the inner cladding layer, and may therefore enable efficient excitation and detection of particles located proximate to the interfaces in the liquid core.

In some embodiments, a method for particle detection is provided, the method comprising: illuminating, by a light-source, one or more particles in a liquid-core waveguide, wherein the liquid-core waveguide comprises: a first cladding layer having a first index of a refraction; and a hollow core extending through the waveguide and comprising a liquid inside the hollow core, wherein the liquid has a second index of refraction higher than the first index of refraction; and detecting, by a detector, light emitted from the one or more particles.

In some embodiments of the method, the method further comprises introducing the one or more particles into the liquid prior to illuminating the one or more particles.

In some embodiments of the method, the method further comprises introducing the liquid into the hollow core prior to illuminating the one or more particles.

In some embodiments of the method, the first index of refraction is less than or equal to 2, 1.8, 1.6, or 1.4.

In some embodiments of the method, the second index of refraction is greater than or equal to 2, 1.8, 1.6, or 1.4.

In some embodiments of the method, the waveguide is configured to transmit light from the light source via total internal reflection.

In some embodiments of the method, the waveguide is configured to support a fundamental transverse electromagnetic mode of light from the light source.

In some embodiments of the method, the waveguide is configured such that an intensity of the fundamental transverse electromagnetic mode has a non-zero value at an interface between the first cladding layer and the hollow core.

In some embodiments of the method, the waveguide is configured such that an intensity of the fundamental transverse electromagnetic mode at an interface between the first cladding layer and the hollow core is greater than or equal to 20%, 30%, 40%, 50%, 60%, 70%, 80%, 90%, or 99% of a maximum intensity of the fundamental transverse electric mode.

In some embodiments of the method, the hollow core is less than or equal to 20 μm, 10 μm, 5 μm, or 1 μm in width.

In some embodiments of the method, the first cladding layer is less than or equal to 10 μm, 5 μm, 1 μm, 0.5 μm, or 0.1 μm in thickness.

In some embodiments of the method, the first cladding layer comprises one or more of silicon dioxide, tantalum pentoxide, or silicon nitride, PDMS, or one or more plastics.

In some embodiments of the method, the liquid-core waveguide is disposed on a substrate less than or equal to 2 cm, 1 cm, 5 mm, or 2 mm in width and less than or equal to 2 cm, 1 cm, 5 mm, or 2 mm in length.

In some embodiments of the method, the light source is disposed on the substrate.

In some embodiments of the method, the detector is disposed on the substrate.

In some embodiments of the method, the liquid comprises one or more of zinc iodide, ethylene glycol, or sodium iodide.

In some embodiments of the method, the one or more particles comprise one or more of molecules, particles, biomarkers, nucleic acids, proteins, and DNA.

In some embodiments of the method, the liquid-core waveguide comprises: a second cladding layer between the first cladding layer and the hollow core, wherein the second cladding layer has a third index of refraction that is the same as the second index of refraction or is within +/−10%, +/−5%, +/−2%, +/−1%, +/−0.5%, +/−0.1%, or +/−0.01% of the second index of refraction.

In some embodiments of the method, the waveguide is configured such that an intensity of the fundamental transverse electromagnetic mode at an interface between the second cladding layer and the hollow core is greater than or equal to 20%, 30%, 40%, 50%, 60%, 70%, 80%, 90%, or 99% of a maximum intensity of the fundamental transverse electric mode.

In some embodiments of the method, the second cladding layer is less than or equal to 1 μm, 0.5 μm, or 0.1 μm in thickness.

In some embodiments of the method, the second cladding layer comprises one or more of silicon dioxide, tantalum pentoxide, silicon nitride, PDMS, or plastic.

In some embodiments of the method, the method further comprises identifying one or more of the detected particles on the basis of a detected characteristic.

In some embodiments, a particle detection system is provided, the system comprising: a light source configured to excite one or more particles; a liquid-core waveguide comprising: a first cladding layer having a first index of refraction; and a hollow core extending through the waveguide and comprising a liquid inside the hollow core, wherein: the liquid has a second index of refraction higher than the first index of refraction; and the liquid comprises the one or more particles; and a detector configured to detect light emitted from the one or more particles.

In some embodiments of the system, the system further comprises a second cladding layer between the first cladding layer and the hollow core, wherein the second cladding layer has a third index of refraction that is the same as the second index of refraction or is within +/−10%, +/−5%, +/−1%, +/−0.5%, +/−0.1%, or +/−0.01% of the second index of refraction.

In some embodiments of the system, the liquid-core waveguide is disposed on a substrate less than or equal to 2 cm, 1 cm, 5 mm, or 2 mm in width and less than or equal to 2 cm, 1 cm, 5 mm, or 2 mm in length.

In some embodiments of the system, the light source is disposed on the substrate.

In some embodiments of the system, the detector is disposed on the substrate.

BRIEF DESCRIPTION OF THE DRAWINGS

FIG. 1A shows a cross-sectional view of a liquid-core waveguide wherein the index of refraction of the liquid-core is lower than the index of refraction of the cladding.

FIG. 1B shows the electric field profile for a fundamental optical mode confined in a low-index medium of liquid-core waveguide using ARROW/Bragg confinement.

FIG. 2A shows a cross-sectional view of a liquid-core waveguide wherein the index of refraction of the liquid-core is higher than the index of refraction of the cladding, in accordance with some embodiments.

FIG. 2B shows the electric field profile for a fundamental optical mode in a high-index liquid-core waveguide, in accordance with some embodiments.

FIG. 6B shows the index of refraction profile for a liquid-core waveguide with two cladding layers, in accordance with some embodiments.

FIG. 6C shows the electric field profile for a fundamental optical mode in a liquid-core waveguide with two cladding layers, in accordance with some embodiments.

DETAILED DESCRIPTION OF ILLUSTRATIVE EMBODIMENTS

Figure 3A:
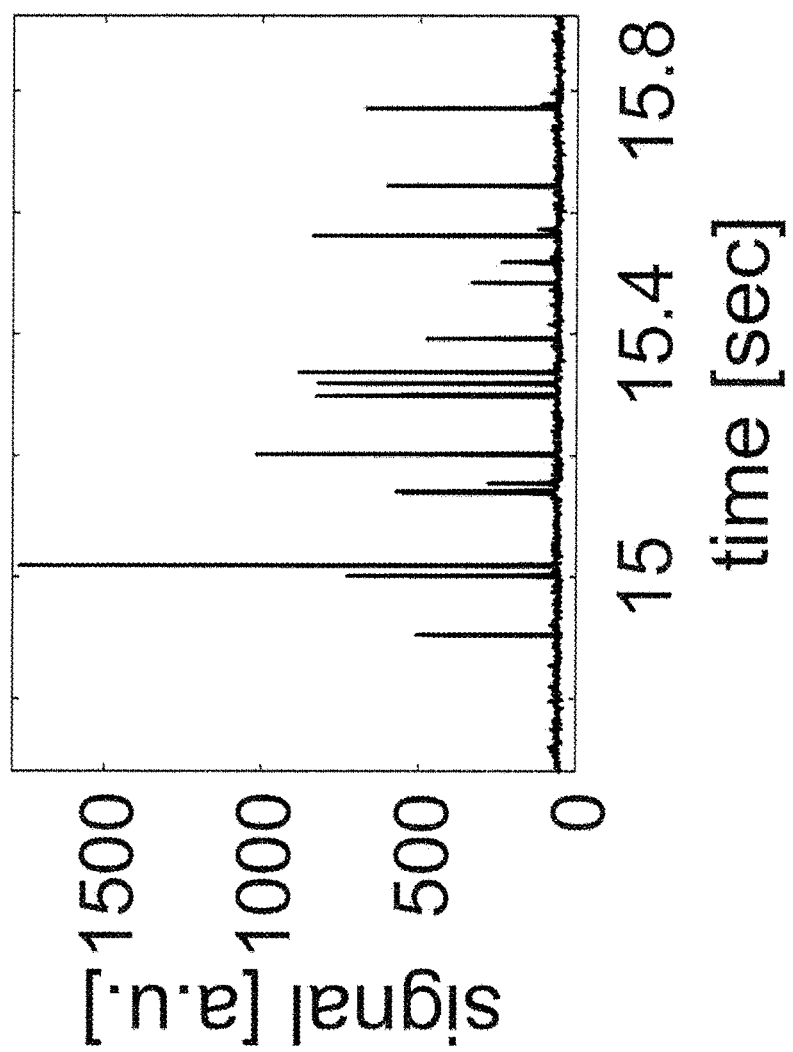
FIG. 3A shows a signal corresponding to detection of fluorescent beads in a liquid-core channel containing zinc iodide, in accordance with some embodiments.

Disclosed herein are systems, methods, and techniques for improved optical detection of biomarkers and other objects using a liquid-core waveguide that may overcome the drawbacks of known methods discussed above and that may address the needs discussed above. The systems, methods, and techniques disclosed herein may enable improved capture of generated light and its transport to a photodetector. As described, target detection in high-index liquids in accordance with the techniques and systems herein may solve the main challenges limiting chip-based detection of biological targets on the single analyte limit.

In some embodiments, the waveguides described herein may be referred to as "high-index liquid-core waveguides." The term "high-index," as used herein, may refer to a liquid-core waveguide in which a refractive core index of the carrier liquid is higher than that of the surrounding cladding layer(s) (e.g., ethylene glycol liquid inside a glass channel). The term "high-index," as used herein, may also be used to refer to the liquid contained in such a liquid-core waveguide (e.g., ethylene glycol liquid may be referred to as a "high-index liquid" in the context of its use in a liquid core waveguide with cladding layer(s) of a lower index of refraction that the index of refraction of the ethylene glycol liquid).

In some embodiments, a liquid-core waveguide comprises a liquid core having a higher index of refraction than the index of refraction of the cladding. This may enable a fundamental optical mode to have a non-zero field strength at the interfaces between the liquid core and the cladding, and may therefore enable efficient excitation and detection of particles located proximate to the interfaces in the liquid core.

As described herein, the effect of employing high-index liquid core waveguides may be to cause the liquid-core waveguide to function in a manner similar to a conventional optical waveguide in which light is guided via total internal reflection. The results of this approach are shown, in one example, in FIGS. 2A and 2B.

FIG. 2A shows a cross-sectional view of a liquid-core waveguide 200, in accordance with some embodiments. In some embodiments, the index of refraction of the liquid-core is higher than the index of refraction of the cladding.

The index of refraction of the liquid core 202 may be an index of refraction of a fluid that fills all or part of the liquid core, which may in some embodiments include zinc iodide liquid, ethylene glycol liquid, sodium iodide solutions, or any other suitable liquid having an index of refraction that is greater than an index of refraction of cladding 204, including, for example:
zinc iodide dissolved in water;
sodium iodide dissolved in water;
ZnCl2 dissolved in water;
ionic liquids, such as (cation/anion):
(1-Et-3-Me-Im-N)/$(SO_2F)_2$)
(1-Et-3-Me-Im-N/$(CN)_2$);
(1-Et-3-Me-Im/TCB);
(1-Et-3-Me-Im/SCN);
(1-Et-3-Me-Im/$SO_3$OH);
(1-Et-3-Me-Im/$SO_3CH_3$);
(Et-Py-N/$(SO_2F)_2$); and/or
(He-Py-N/$(SO_2F)_2$);
other ionic liquids, such as:
choline dihydrogen phosphate; and/or
deep eutectic solvent;
ethylene glycol
organic liquids, such as:
benzyl benzoate;
2-bromethyl benzene;
DMSO;
1,1,2,2-tetrabromoethane;
1,1,2,2-tetrachloroethane; and/or
Tetrachloroethylene; and/or
aqueous solutions, such as:
$AgNO_3$;
$CdCl_2$;
KBr+HgBr;
$Hg(NO_3)_2$:$H_2O$+$HgBr_2$; and/or
$Hg(NO_3)_2$:$H_2O$+$HgI_2$.

In some embodiments, the index of refraction of liquid core 202 may be greater than or equal to 1.25, 1.33, 1.5, 1.75, 2.0, or 2.25. In some embodiments, the index of refraction of liquid core 202 may be less than or equal to 1.25, 1.33, 1.5, 1.75, 2.0, or 2.25. In some embodiments, the index of refraction of liquid core 202 may be between 1.33 and 2.0.

The index of refraction of cladding 204 may be an index of refraction of a solid (and/or flexible) material used to create the cladding, which may in some embodiments include PDMS, one or more plastic, silicon dioxide, tantalum pentoxide, silicon nitride, or any suitable glass and/or oxide. In some embodiments, the index of refraction of cladding 204 may be less than or equal to 1.2, 1.3, 1.4, 1.5, 1.6, 1.7, or 1.8. In some embodiments, the index of refraction of cladding 204 may be greater than or equal to 1.2, 1.3, 1.4, 1.5, 1.6, 1.7, or 1.8. In some embodiments, the index of refraction of cladding 204 may be between 1.4 and 1.6.

In some embodiments, the width ("w" as shown in FIG. 2B) of liquid-core 202 of liquid-core waveguide 200 may be less than or equal to 0.25 µm, 0.5 µm, 1 µm, 5 µm, 10 µm, 15 µm, 20 µm, 30 µm, or 50 µm. In some embodiments, the width of liquid-core 202 of liquid-core waveguide 200 may be greater than or equal to 0.25 µm, 0.5 µm, 1 µm, 5 µm, 10 µm, 15 µm, 20 µm, 30 µm, or 50 µm. In some embodiments, the width of liquid core 202 may be between 1 µm and 20 µm.

In some embodiments, the height of liquid core 202 may be less than or equal to 0.25 µm, 0.5 µm, 1 µm, 5 µm, 10 µm, 15 µm, or 20 µm. In some embodiments, the height of liquid core 202 may be greater than or equal to 0.25 µm, 0.5 µm, 1 µm, 5 µm, 10 µm, 15 µm, or 20 µm. In some embodiments, the height of liquid core 202 may be between 1 µm and 10 µm.

While liquid core 202 is shown in the example of FIGS. 2A and 2B as rectangular, it may in some embodiments have a square, round, semi-circular, or any suitable cross-sectional shape.

In some embodiments, cladding 204 may have a thickness of less than 0.25 µm, 0.5 µm, 1 µm, 5 µm, 10 µm, 15 µm, or 20 µm. In some embodiments, cladding 204 may have a thickness of greater than 0.25 µm, 0.5 µm, 1 µm, 5 µm, 10 µm, 15 µm, or 20 µm. In some embodiments, cladding 204 may have a thickness of between 0.01 µm and 10 µm.

FIG. 2B shows the electric field profile for a fundamental optical mode in a high-index liquid-core waveguide, such as waveguide 200, in accordance with some embodiments. As shown, the mode profile has a finite, non-zero strength at interfaces 214a and 214b between liquid-core 202 and cladding 204, due to the nature of the solutions to the Helmholtz equation. This is distinguishable from the mode shown in FIG. 1B, in which the mode profile is forced to zero at the interface of low-index liquid core 102 and cladding 104. In some embodiments, the mode strength at interface 214a and/or 214b may be greater than or equal to 1%, 5%, 10%, 20%, 30%, 40%, 50%, 60%, 70%, 80%, 90%, 95%, or 99% of the mode strength at maximum 212 at the center of liquid core 202. In some embodiments, the mode strength at 214a and/or 214b may be less than or equal to 1%, 5%, 10%, 20%, 30%, 40%, 50%, 60%, 70%, 80%, 90%, 95%, or 99% of the mode strength at maximum 212 at the center of liquid core 202. The value of the field strength of the mode at interfaces 214a and/or 214b relative to the field strength maximum 212 at the center of liquid core 202 may be controlled via the channel dimensions and the relative indices of the core and cladding materials.

It should be noted that the field profiles shown and discussed herein (both with respect to the example of FIG. 2B and with respect to FIG. 6C) show and refer to field profiles for a lateral dimension (e.g., width-wise across the waveguide) of a fundamental transverse electromagnetic mode. However, it should be noted that fields of modes of light propagating through waveguides as disclosed herein may have the same of similar properties in the vertical dimension (e.g., height-wise across the waveguide) as they do in the lateral dimension.

The effect of the profile of the mode in FIG. 2B can also be seen in the depiction of the mode in FIG. 2A, which shows a more uniform brightness that extends across the entirety of liquid-core 202, as compared to the mode spot in liquid-core 102 that is concentrated only at the center of the liquid core and that is very weak near the channel walls.

Thus, while particles in liquid core 102 near interface 114a or 114b are not excitable and/or detectable due to the weak mode strength there, particles in liquid core 202 near interface 214a or 214b may be excitable and detectable because the mode strength there may be substantially stronger due to the mode's extension into cladding 204 and due to the fact that the mode is not forced to zero at interface 214a or 214b.

In this way, the problem discussed above of incomplete detection of target analytes may be addressed by using a high-index liquid to ensure that analytes are detectable at all parts of a liquid core. Furthermore, the problem discussed above of the difficulty of detecting targets labeled with only a single or few fluorescent dyes may be addressed because total-internal-reflection-guiding waveguides are theoretically lossless, and may therefore be fabricated to be extremely efficient (e.g., essentially lossless) in practice. In practice, the only losses may be due to fabrication imperfections, which may be addressed and minimized independently. Thus, transport of light along a channel such as one defined by waveguide 200 may be significantly improved as compared to leaky-mode guiding such as with waveguide 100.

EXAMPLES

Figure 3B:
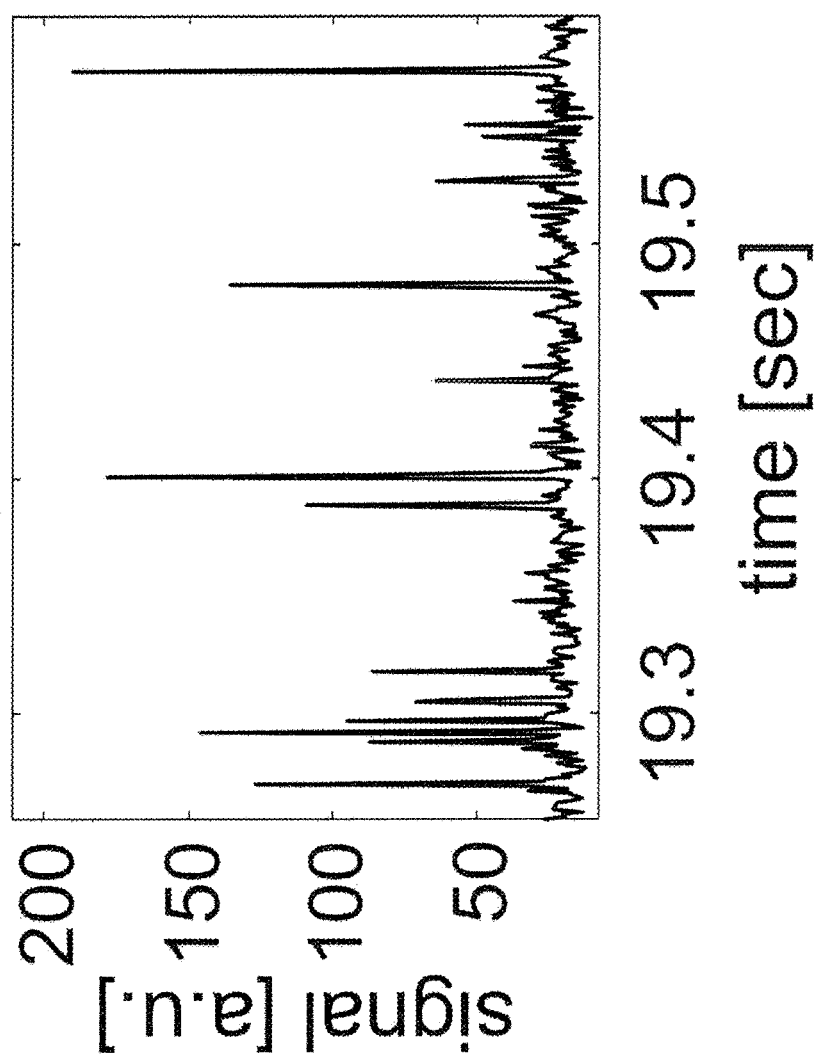
FIG. 3B shows a signal corresponding to detection of fluorescent beads in a liquid-core channel containing water, in accordance with some embodiments.
Figure 3C:
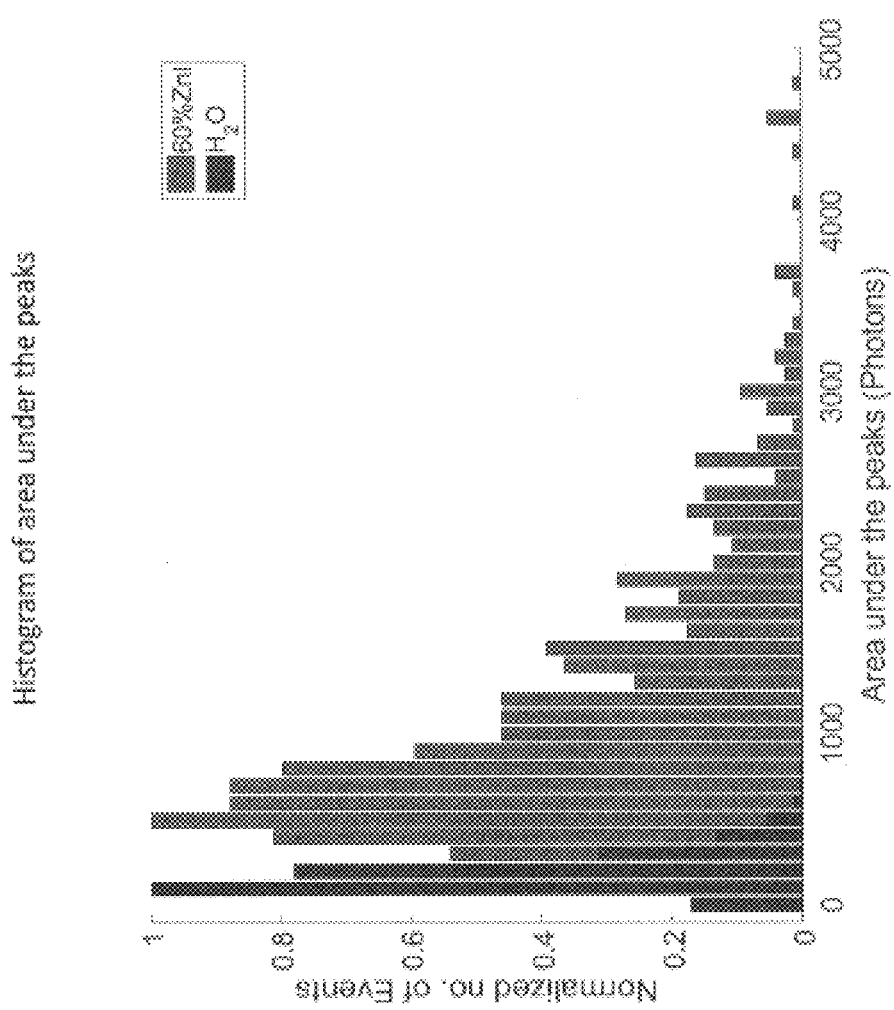
FIG. 3C shows a histogram comparing the area under the peaks of the signal in FIG. 3A and the signal in FIG. 3B, in accordance with some embodiments.

FIGS. 3A-3C show experimental data for emission from 100 nm fluorescent in liquid at a concentration of $10^7$ beads per mL, illuminated by 488 nm light in a liquid-core waveguide. FIG. 3A shows a signal corresponding to detection of the beads in a liquid-core channel containing 60% zinc iodide and 40% $H_2O$, which has an index of refraction of about 1.49 and a viscosity of about 2 cP. FIG. 3B shows a signal corresponding to detection of the beads in a liquid-core channel having ARROW layers on a bottom side and SiO2 layers (having an index of refraction of 1.46) on the other three sides, the channel containing water, which has an index of refraction of about 1.33 and a viscosity of about 1 cP.

As shown in FIGS. 3A and 3B, the emission spikes from the fluorescent beads in the zinc iodide solution (FIG. 3A) were substantially higher than the spikes from the fluorescent beads in water (FIG. 3B). The x-axes in FIGS. 3A and 3B show time in seconds, and the y-axes show photometer counts per 1 ms.

FIG. 3C shows a histogram comparing the area under the peaks of the signal in FIG. 3A and the signal in FIG. 3B. The darker-colored bars at the left of the histogram correspond to the beads in water, while the lighter-colored bars correspond to the beads in the zinc iodide solution.

Table 1 (below) shows data corresponding to the beads in water and to the beads in zinc iodide, as well as ratios comparing the data from each liquid. As shown, beads in the zinc iodide solution showed higher average peak intensity and a higher background signal.

TABLE 1

|  | Average Peak (counts/1 ms) | Background (Counts/1 ms) | Signal to Noise Ratio |
|---|---|---|---|
| Water | 115 | 35 | 3.3 |
| 60% zinc iodide | 475 | 85 | 5.6 |
| $ZnI_2$:$H_2O$ | 4.1 | 2.4 | 1.7 |

Figure 4A:
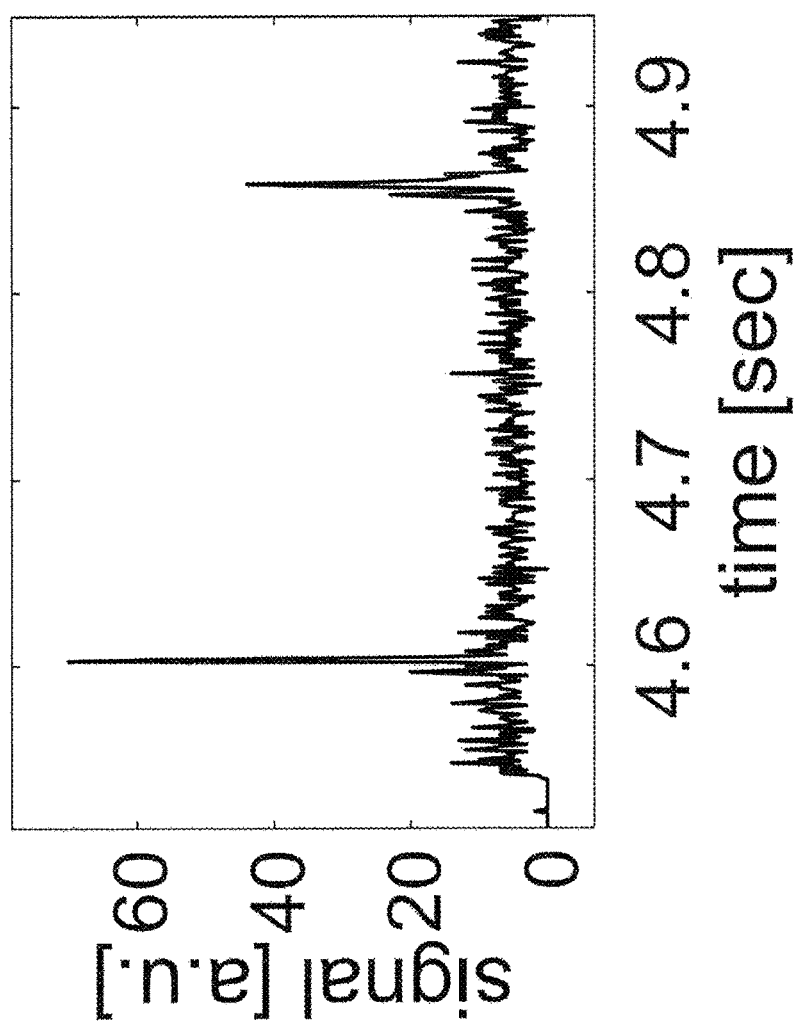
FIG. 4A shows a signal corresponding to detection of fluorescent beads in a liquid-core channel containing ethylene glycol, in accordance with some embodiments.
Figure 4B:
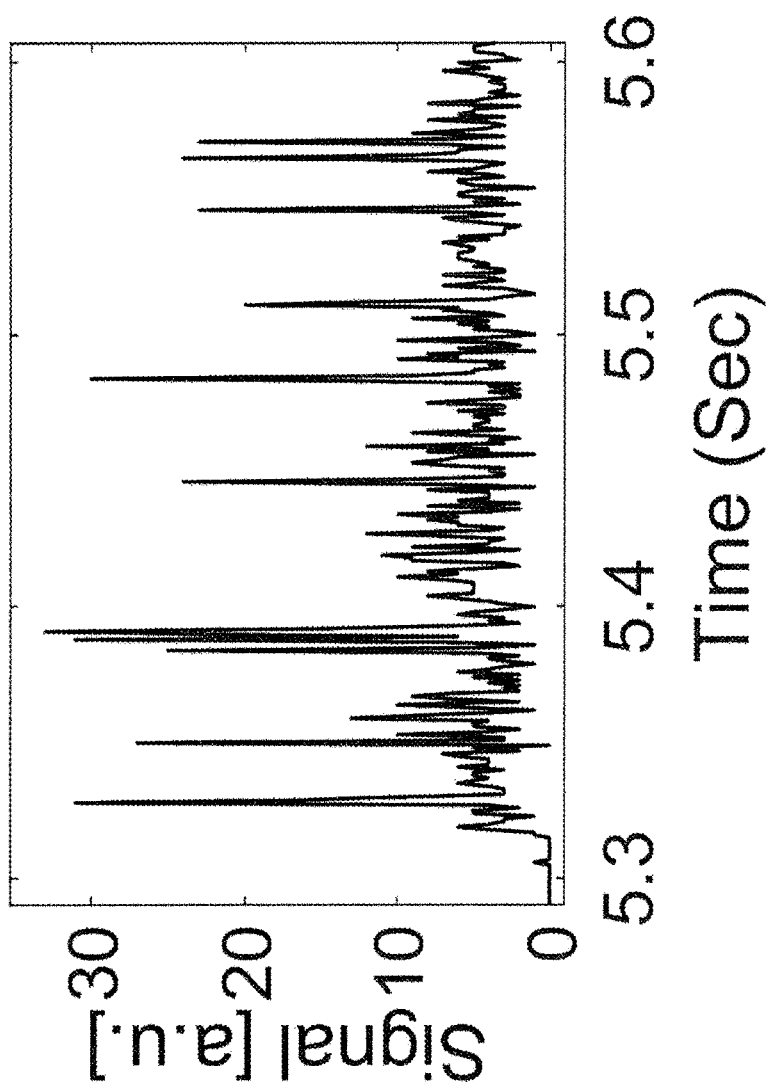
FIG. 4B shows a signal corresponding to detection of fluorescent beads in a liquid-core channel containing water, in accordance with some embodiments.
Figure 4C:
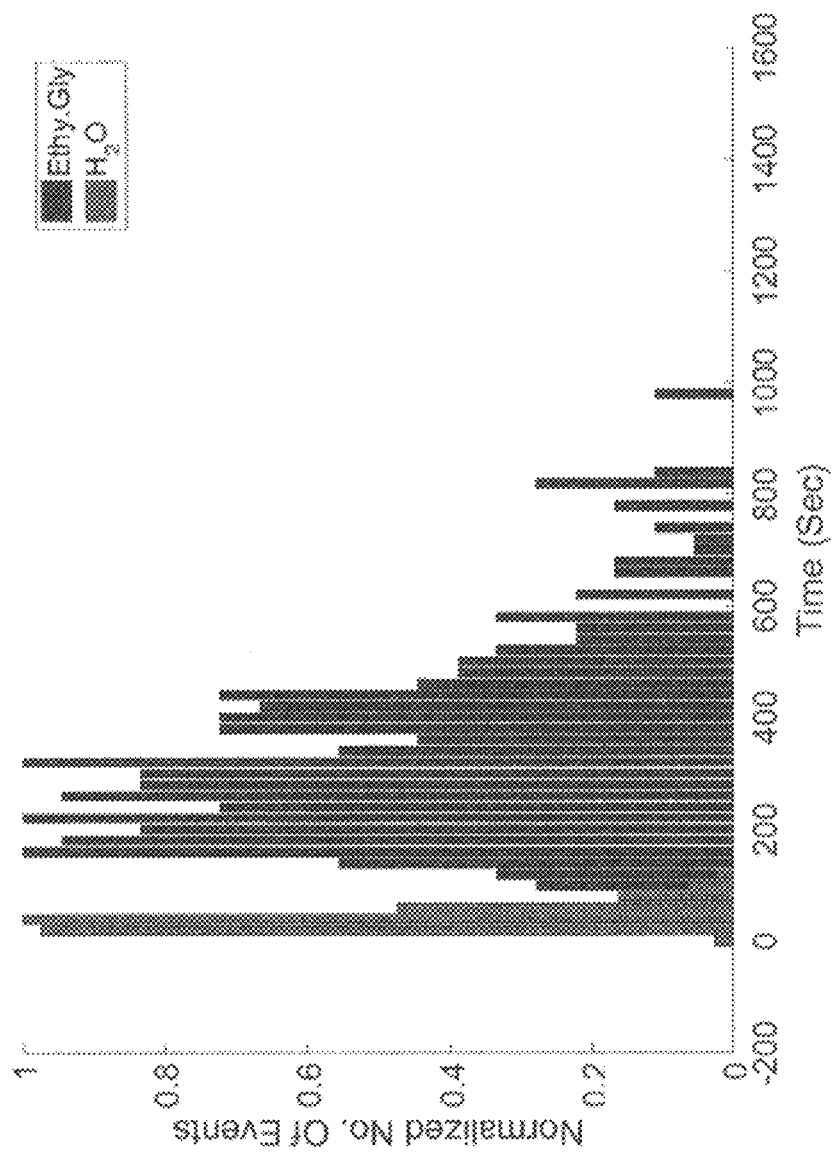
FIG. 4C shows a histogram comparing the area under the peaks of the signal in FIG. 4A and the signal in FIG. 4B, in accordance with some embodiments.

FIGS. 4A-4C show experimental data for emission from 100 nm fluorescent in liquid at a concentration of $10^7$ beads per mL, illuminated by 488 nm light in a liquid-core waveguide. FIG. 4A shows a signal corresponding to detection of the beads in a liquid-core channel containing ethylene glycol liquid, which has an index of refraction of about 1.43 and a viscosity of about 16 cP. FIG. 4B shows a signal corresponding to detection of the beads in a liquid-core channel having ARROW layers on a bottom side and Sift layers (having an index of refraction of 1.46) on the other three sides, the channel containing water, which has an index of refraction of about 1.33 and a viscosity of about 1 cP.

As shown in FIGS. 4A and 4B, the emission spikes from the fluorescent beads in the ethylene glycol liquid (FIG. 4A) were substantially higher than the spikes from the fluorescent beads in water (FIG. 4B). The x-axes in FIGS. 4A and 4B show time in seconds, and the y-axes show photometer counts per time.

FIG. 4C shows a histogram comparing the area under the peaks of the signal in FIG. 4A and the signal in FIG. 4B. The lighter-colored bars at the left of the histogram correspond to the beads in water, while the darker-colored bars correspond to the beads in the ethylene glycol liquid.

Table 2 (below) shows data corresponding to the beads in water and to the beads in ethylene glycol liquid, as well as ratios comparing the data from each liquid. As shown, beads in the ethylene glycol liquid showed higher average peak intensity and a similar background signal.

TABLE 2

| | Average Peak (counts/1 ms) | Background (Counts 1/ms) | Signal to Noise Ratio |
| --- | --- | --- | --- |
| Water | 23 | 12.1 | 1.9 |
| Ethylene Glycol | 44.3 | 12.6 | 3.5 |
| $(CH_2OH)_2:H_2O$ | 1.9 | 1.04 | 1.84 |

Figure 5A:
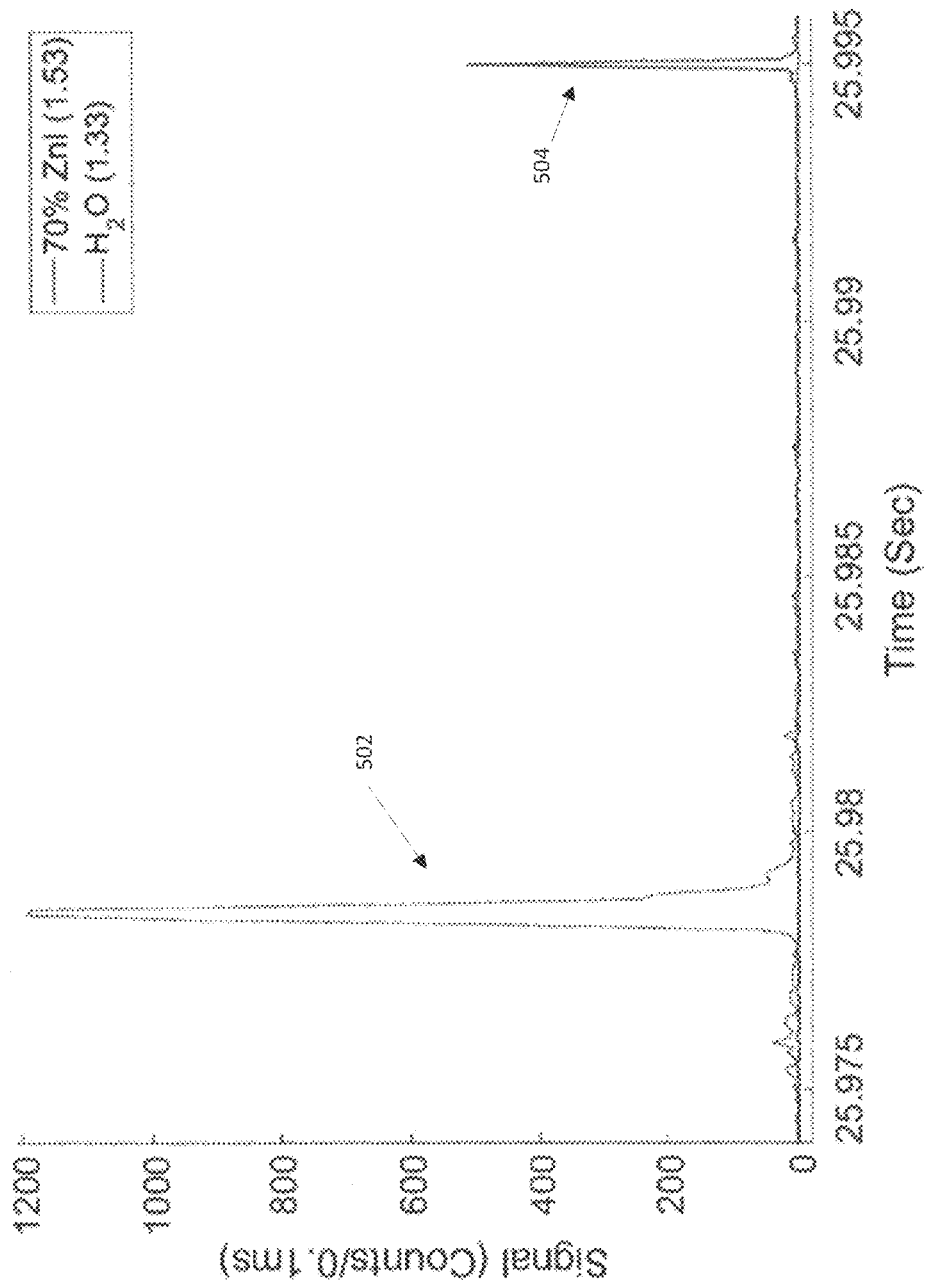
FIG. 5A shows a signal corresponding to detection of fluorescent beads in a liquid-core channel containing zinc iodide, and a signal corresponding to detection of fluorescent beads in a liquid-core channel containing water, in accordance with some embodiments.
Figure 5B:
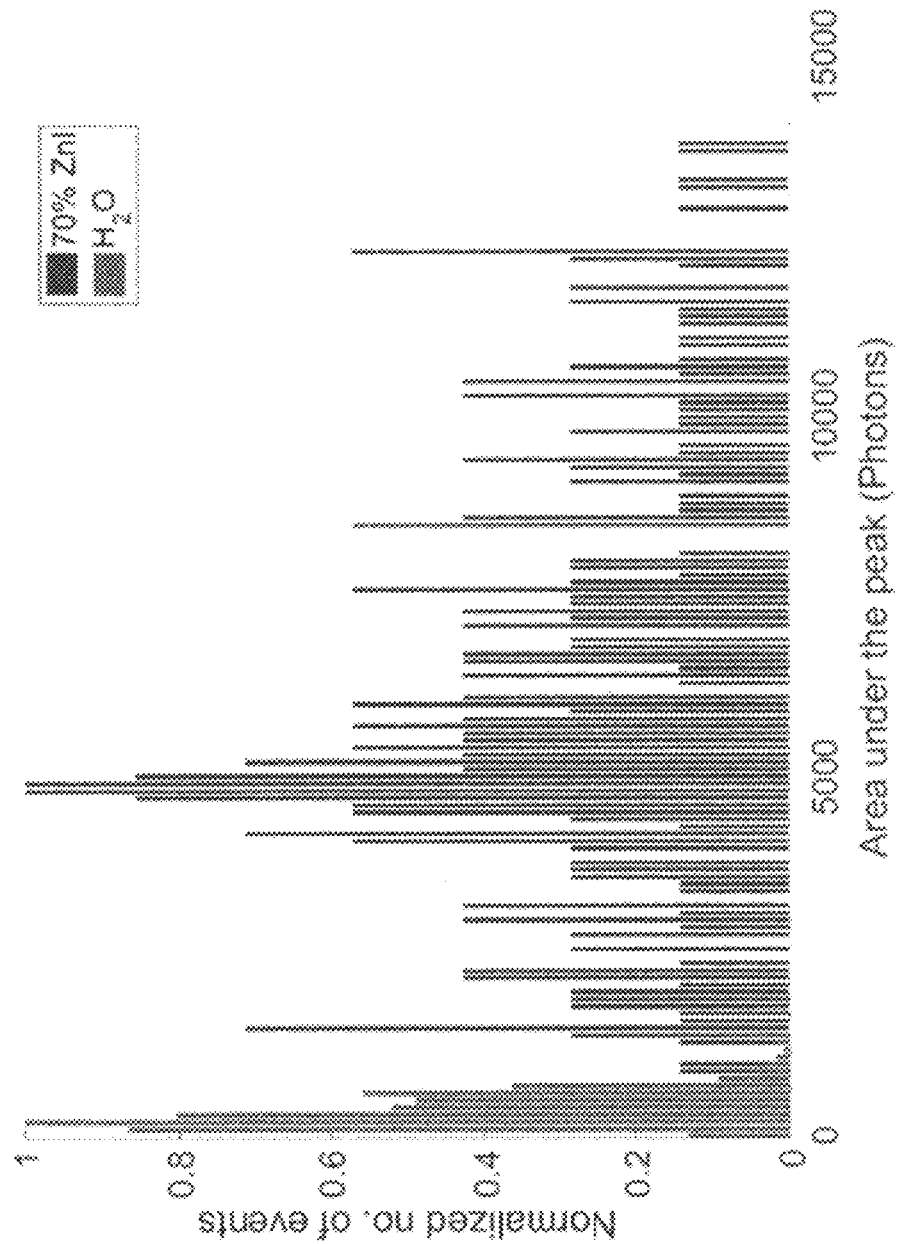
FIG. 5B shows a histogram comparing the area under the peaks of the two signals in FIG. 5A, in accordance with some embodiments.

FIGS. 5A and 5B show experimental data for emission from 2 μm fluorescent beads in liquid at a concentration of 10' beads per mL, illuminated by 488 nm light in a liquid-core waveguide. In FIG. 5A, the signal 502 comprising the higher peak corresponds to detection of the beads in a liquid-core channel containing 70% zinc iodide, which has an index of refraction of 1.53 and a viscosity of 3 cP. The signal 504 comprising the lower peak corresponds to detection of the beads in a liquid-core channel having ARROW layers on a bottom side and Sift layers (having an index of refraction of 1.46) on the other three sides, the channel containing water, which has an index of refraction of about 1.33 and a viscosity of about 1 cP. As shown in FIG. 5A, the emission spike from the fluorescent beads in the zinc iodide solution was substantially higher than the spike from the fluorescent beads in water.

FIG. 5B shows a histogram comparing the area under the peaks of signal 502 and the area under the peaks of signal 504. The lighter-colored bars at the left of the histogram correspond to the beads in water, while the darker-colored bars correspond to the beads in the zinc iodide solution.

Table 3 (below) shows data corresponding to the beads in water and to the beads in zinc iodide solution, as well as ratios comparing the data from each liquid. As shown, beads in the zinc iodide solution showed higher average peak intensity, similar background signal, and an almost 25× increase in photon collection per event as compared to beads in water.

TABLE 3

| | Average Peak (counts/0.1 ms) | Background (Counts/0.1 ms) | Signal to Noise Ratio |
| --- | --- | --- | --- |
| Water | 270 | 9 | 30 |
| 60% zinc iodide | 947 | 10 | 95 |
| $ZnI_2:H_2O$ | 3.5 | 1.1 | 3.2 |

High-Index Liquid-Core Waveguides with Two-layer Cladding

In some embodiments, a liquid-core waveguide comprises a liquid core, an inner cladding layer, and an outer cladding layer. By matching the index of refraction of the liquid core to the index of refraction of the inner cladding layer, and by selecting an outer cladding layer having a lower index of refraction than both the inner cladding layer and the liquid core, a fundamental optical mode may have a non-zero field strength at the interfaces between the liquid core and the inner cladding layer, and may therefore enable efficient excitation and detection of particles located proximate to the interfaces in the liquid core. The results of this approach are shown, in one example, in FIGS. 6A-6C.

Figure 6A:
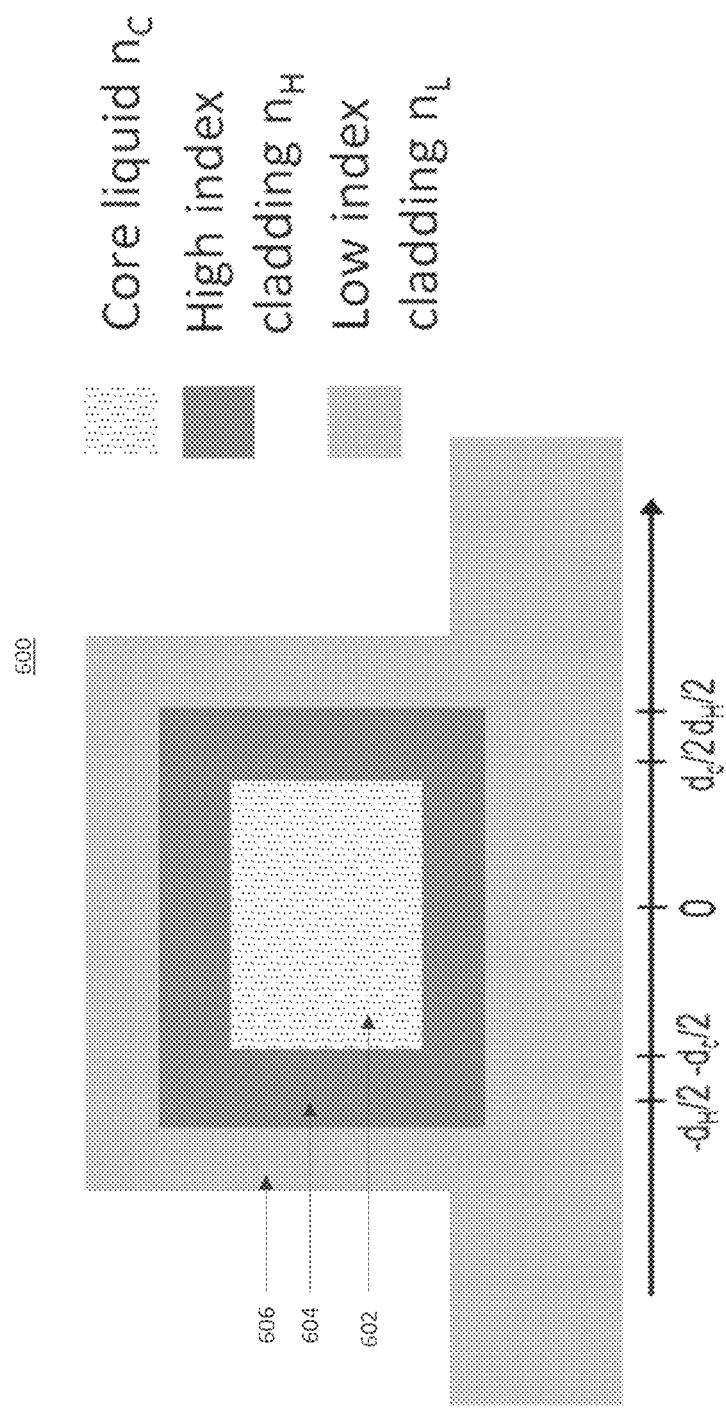
FIG. 6A shows a cross-sectional view of a liquid-core waveguide with two cladding layers, in accordance with some embodiments.

FIG. 6A shows a cross-sectional view of a liquid-core waveguide 600, in accordance with some embodiments. As shown, waveguide 600 includes liquid core 602, inner cladding 604, and outer cladding 606. In some embodiments, one or more additional claddings (e.g., other cladding layers) may also be included. In some embodiments, as described herein, an index of refraction of liquid core 602 may be matched (e.g., may be equivalent to or very similar to) an index of refraction of cladding 604, while cladding 606 may have a lower index of refraction than both cladding 604 and liquid core 602. As described herein, this arrangement may cause an electric field profile of a fundamental mode to be relatively uniform and strong across the entire width of liquid core 602.

The index of refraction of the liquid core 602 may be an index of refraction of a fluid that fills all or part of the liquid core, which may in some embodiments include zinc iodide liquid, ethylene glycol liquid, or any suitable liquid having an index of refraction that is greater than an index of refraction of cladding 606. In some embodiments, liquid-core 602 may share any one or more characteristics in common with liquid-core 202 discussed above with respect to FIG. 2. In some embodiments, the index of refraction of liquid core 602 may be greater than or equal to 1.25, 1.35, 1.45, 1.75, 2.0, or 2.25. In some embodiments, the index of refraction of liquid core 602 may be less than or equal to 1.25, 1.35, 1.45, 1.75, 2.0, or 2.25. In some embodiments, the index of refraction of liquid core 602 may be between 1.45 and 2.0.

In some embodiments, the width ("do" as shown in FIG. 6B) of liquid-core 602 of liquid-core waveguide 600 may be less than or equal to 0.25 μm, 0.5 μm, 1 μm, 5 μm, 10 μm, 15 μm, 20 μm, 30 μm, or 50 μm. In some embodiments, the width of liquid-core 602 of liquid-core waveguide 600 may be greater than or equal to 0.25 μm, 0.5 μm, 1 μm, 5 μm, 10 μm, 15 μm, 20 μm, 30 μm, or 50 μm. In some embodiments, the width of liquid-core 602 may be between 1 μm and 20 μm.

In some embodiments, the height of liquid core 602 may be less than or equal to 0.25 μm, 0.5 μm, 1 μm, 5 μm, 10 μm, 15 μm, or 20 μm. In some embodiments, the height of liquid core 602 may be greater than or equal to 0.25 μm, 0.5 μm, 1 μm, 5 μm, 10 μm, 15 μm, or 20 μm. In some embodiments, the height of liquid core 602 may be between 1 μm and 10 μm.

While liquid core 602 is shown in the example of FIGS. 2A and 2B as rectangular, it may in some embodiments have a square, round, semi-circular, or any suitable cross-sectional shape.

The index of refraction of cladding 604 may be an index of refraction of a solid (and/or flexible) material used to create cladding 604, which may in some embodiments include silicon dioxide, tantalum pentoxide, silicon nitride, or any suitable glass and/or oxide, PDMS, or plastic. In some embodiments, cladding 604 may share any one or more characteristics in common with cladding 204 discussed above with respect to FIG. 2. In some embodiments, the index of refraction of cladding 604 may be less than or equal to 1.2, 1.3, 1.4, 1.5, 1.6, 1.7, 1.8, 1.9, 2.0, 2.1, or 2.2. In some embodiments, the index of refraction of cladding 604 may be greater than or equal to 1.2, 1.3, 1.4, 1.5, 1.6, 1.7, 1.8, 1.9, 2.0, 2.1, or 2.2. In some embodiments, the index of refraction of cladding 204 may be between 1.4 and 2.0.

In some embodiments, the index of refraction of cladding 604 may be selected to be within +/−0.5%, +/−1%, +/−2%, +/−3%, or +/−5% of the index of refraction of liquid core 602, such that the mode may be supported continuously across both regions as shown in FIG. 6A.

In some embodiments, cladding 604 may have a thickness (($d_h$−$d_c$) as shown in FIG. 6B) of less than or equal to 0.25 μm, 0.5 μm, 1 μm, 5 μm, 10 μm, 15 μm, or 20 μm. In some embodiments, cladding 604 may have a thickness of greater than or equal to 0.25 μm, 0.5 μm, 1 μm, 5 μm, 10 μm, 15 μm, or 20 μm. In some embodiments, cladding 604 may have a thickness of between 1 μm and 10 μm.

The index of refraction of cladding 606 may be an index of refraction of a solid (and/or flexible) material used to create cladding 606, which may in some embodiments include silicon dioxide, tantalum pentoxide, silicon nitride, or any suitable glass and/or oxide, or PDMS or plastic. In some embodiments, cladding 606 may share any one or more characteristics in common with cladding 604 discussed above or with cladding 204 discussed above with respect to FIG. 2. In some embodiments, the index of refraction of cladding 606 may be less than or equal to 0.8, 0.9, 1, 1.1, 1.25, 1.5, 1.75, 1.9, 2, 2.1, or 2.2. In some embodiments, the index of refraction of cladding 606 may be greater than or equal to 0.8, 0.9, 1, 1.1, 1.25, 1.5, 1.75, 1.9, 2, 2.1, or 2.2. In some embodiments, the index of refraction of cladding 606 may be between 1 and 2.

In some embodiments, the index of refraction of cladding 606 may be selected to be at least 1%, 5%, 10%, 50%, 75%, or 100% less than the index of refraction of cladding 604.

In some embodiments, cladding 606 may have a thickness of less than or equal to 0.25 μm, 0.5 μm, 1 μm, 5 μm, 10 μm, 15 μm, or 20 μm. In some embodiments, cladding 606 may have a thickness of greater than or equal to 0.25 μm, 0.5 μm, 1 μm, 5 μm, 10 μm, 15 μm, or 20 μm. In some embodiments, cladding 606 may have a thickness of between 1 μm and 10 μm.

FIG. 6B shows the index of refraction profile for a high-index liquid-core waveguide, such as waveguide 600, with an inner cladding layer having an index of refraction that matches the index of refraction of the liquid core, in accordance with some embodiment. As shown, the index of refraction nc of the liquid core 602 may be equivalent (or similar within a predefined percentage or absolute range) to the index of refraction nil of the inner cladding layer 604. As further shown, the index of refraction nc of the liquid core and the index of refraction nil of the inner cladding layer may both be greater than the index of refraction of the outer cladding layer 606.

FIG. 6C shows the electric field profile for a fundamental optical mode in a high-index liquid-core waveguide such as waveguide 600, with an inner cladding layer having an index of refraction that matches the index of refraction of the liquid core, in accordance with some embodiment. As shown, the mode profile has a finite, non-zero strength at interfaces 614a and 614b between liquid-core 602 and cladding 604, due to the nature of the solutions to the Helmholtz equation. Furthermore, because the mode decays as a result of the lower index of refraction in the outer cladding layer 606 and not as a result of the index of refraction of inner cladding layer 604 (as the index of refraction of inner cladding layer 604 may be equivalent to the index of refraction of liquid core 602), the profile of the electric field of the mode across liquid core 602 may be even stronger and more stable than the profile of the electric field of the mode across liquid core 202 discussed above; that is, the mode in liquid core 202 decays more rapidly due to the index change immediately outside interfaces 214a and 214b, while the mode in liquid core 602 decays due to an index change that is spaced apart from interfaces 614a and 614b.

In some embodiments, the mode strength at interface 614a and/or 614b may be greater than or equal to 1%, 5%, 10%, 20%, 30%, 40%, 50%, 60%, 70%, 80%, 90%, or 95% of the mode strength at maximum 612 at the center of liquid core 602. In some embodiments, the mode strength at 614a and/or 614b may be less than or equal to 5%, 10%, 20%, 30%, 40%, 50%, 60%, 70%, 80%, 90%, 95%, or 99% of the mode strength at maximum 612 at the center of liquid core 602.

In some embodiments, the mode strength at interface 614a and/or 614b may be greater than or equal to 101%, 105%, 110%, 150%, 2 times, three times, or five times greater than the mode strength at interfaces 616a and/or 616b between inner cladding layer 604 and outer cladding layer 606. In some embodiments, the mode strength at interface 614a and/or 614b may be less than or equal to 105%, 110%, 150%, 2 times, three times, five times, or ten times greater than the mode strength at interfaces 616a and/or 616b.

The relative values of the field strength of the mode at maximum 612, interfaces 614a and/or 614b, and/or interfaces 616a and/or 616b may be controlled via the channel dimensions and the relative indices of the core and multiple cladding materials.

Thus, while particles in liquid core 102 near interface 114a or 114b are not excitable and/or detectable due to the weak mode strength there, particles in liquid core 602 near interface 614a or 614b may be excitable and detectable because the mode strength there may be substantially stronger due to the mode's extension into cladding 604 and due to the fact that the mode is not forced to zero at interface 614a or 614b. Furthermore, while particles in liquid core 202 near interface 214a or 214b may be excitable and detectable, particles in liquid core 602 near interface 614a or 614b may be more excitable and more detectable with more intensity because the mode in liquid core 602 does not decay due as rapidly because there is no (or very little) index change at interfaces 614a and/or 614b.

In this way, the problem discussed above of incomplete detection of target analytes may be addressed by using a high-index liquid to ensure that analytes are detectable at all parts of a liquid core. Furthermore, the problem discussed above of the difficulty of detecting targets labeled with only a single or few fluorescent dyes may be addressed because total-internal-reflection-guiding waveguides are theoretically lossless, and may therefore be fabricated to be extremely efficient (e.g., essentially lossless) in practice. In practice, the only losses may be due to fabrication imperfections, which may be addressed and minimized independently. Thus, transport of light along a channel such as one defined by waveguide 200 and/or waveguide 600 may be significantly improved as compared to leaky-mode guiding such as with waveguide 100.

Systems using High-Index Liquid-Core Waveguides

In some embodiments for using a high-index liquid core waveguide for particle detection as described herein, all sample preparation steps may be carried out using the original matrix (e.g., blood), which is typically aqueous, and the optically active (e.g., fluorescently labeled) targets may be released into a high-index liquid immediately or shortly before detection in the hollow microchannel. In some embodiments, the targets may be released into a high-index liquid less than 1 second, 30 seconds, 1 minute, 5 minutes, 10 minutes, or 30 minutes before detection.

In some embodiments, high-index liquids that do not destroy DNA, do not denature proteins, and/or do not otherwise damage or alter biological analytes may be selected for use in high-index liquid-core waveguides.

In some embodiments, systems for particle detection using high-index liquid core waveguides may comprise one or more components for cell lysing, fluorescent labeling, target extractions, filtering of analyte fluid (e.g., to remove pieces too large for an analyte channel), sample flow control (e.g., by one or more microvalve-based components) or other sample preparation processes. In some embodiments, any one or more of these components may be disposed on a same substrate (e.g., chip) as one or more of the other components discussed herein.

In some embodiments, detection of particles on using the systems and/or techniques disclosed herein may be used to identify one or more detected particles. For example, a detected particle may be identified on the basis of its emission wavelength, its emission intensity, a detected velocity, or any other detected characteristic about the particle that may be compared to one or more databases or other known information to determine an identity of the detected particle.

In some embodiments, one or more high-index liquid-core waveguides may be disposed on a chip or on another suitable substrate. In some embodiments, a substrate or chip on which one or more high-index liquid-core waveguides are disposed may be less than 1 mm, 2 mm, 5 mm, 1 cm, 2 cm, or 3 cm in width; and may be less than 1 mm, 2 mm, 5 mm, 1 cm, 2 cm, or 3 cm in length. In some embodiments, a substrate or chip on which one or more high-index liquid-core waveguides are disposed may be greater than 1 mm, 2 mm, 5 mm, 1 cm, 2 cm, or 3 cm in width; and may be greater than 1 mm, 2 mm, 5 mm, 1 cm, 2 cm, or 3 cm in length. In some embodiments, a substrate or chip on which one or more high-index liquid-core waveguides are disposed may be between 2×2 mm and 2×2 cm.

What is claimed is:

1. A method for particle detection, the method comprising:
    illuminating, by a light source, one or more particles in a liquid-core waveguide configured to support a fundamental transverse electromagnetic mode of light from the light source, wherein the liquid-core waveguide comprises:
        a first cladding layer having a first index of a refraction; and
        a hollow core extending through the waveguide and comprising a liquid inside the hollow core, wherein the liquid has a second index of refraction higher than the first index of refraction; and
        a second cladding layer between the first cladding layer and the hollow core, wherein the second cladding layer has a third index of refraction, wherein the second and third indices of refraction are such that an intensity of a fundamental electromagnetic mode at an interface between the second cladding layer and the hollow core is greater than or equal to 20% of a maximum intensity of the fundamental transverse electromagnetic mode; and
    detecting, by a detector, light emitted from the one or more particles.

2. The method of claim 1, further comprising introducing the one or more particles into the liquid prior to illuminating the one or more particles.

3. The method of claim 1, further comprising introducing the liquid into the hollow core prior to illuminating the one or more particles.

4. The method of claim 1, wherein the first index of refraction is less than or equal to 1.4.

5. The method of claim 1, wherein the second index of refraction is greater than or equal to 1.4.

6. The method of claim 1, wherein the waveguide is configured to transmit light from the light source via total internal reflection.

7. The method of claim 1, wherein the hollow core is less than or equal to 20 μm in width.

8. The method of claim 1, wherein the first cladding layer is less than or equal to 10 μm in thickness.

9. The method of claim 1, wherein the first cladding layer comprises one or more of: silicon dioxide, tantalum pentoxide, silicon nitride, PDMS, and one or more plastics.

10. The method of claim 1, wherein the liquid-core waveguide is disposed on a substrate less than or equal to 2 cm in width and less than or equal to 2 cm in length.

11. The method of claim 10, wherein the light source is disposed on the substrate.

12. The method of claim 10, wherein the detector is disposed on the substrate.

13. The method of claim 1, wherein the liquid comprises one or more of: zinc iodide, ethylene glycol, and sodium iodide.

14. The method of claim 1, wherein the one or more particles comprise one or more of: molecules, particles, biomarkers, nucleic acids, proteins, and DNA.

15. The method of claim 1,
    wherein the third index of refraction is the same as the second index of refraction or is within +/−10%, of the second index of refraction.

16. The method of claim 1, wherein the second cladding layer is less than or equal to 1 μm.

17. The method of claim 1, wherein the second cladding layer comprises one or more of: silicon dioxide, tantalum pentoxide, silicon nitride, PDMS, and plastic.

18. The method of claim 1, further comprising identifying one or more of the detected particles on the basis of a detected characteristic.

19. A particle detection system comprising:
    a light source configured to excite one or more particles;
    a liquid-core waveguide configured to support a fundamental transverse electromagnetic mode of light from the light source, comprising:
        a first cladding layer having a first index of refraction;
        a hollow core extending through the waveguide and comprising a liquid inside the hollow core, wherein:
            the liquid has a second index of refraction higher than the first index of refraction; and
            the liquid comprises the one or more particles;
        a second cladding layer between the first cladding layer and the hollow core, wherein the second cladding layer has a third index of refraction, wherein the second and third indices of refraction are such that an intensity of a fundamental electromagnetic mode at an interface between the second cladding layer and the hollow core is greater than or equal to 20% of a maximum intensity of the fundamental transverse electromagnetic mode; and a detector configured to detect light emitted from the one or more particles.

20. The particle detection system of claim 19, wherein the third index of refraction is the same as the second index of refraction or is within +/−10% of the second index of refraction.

21. The particle detection system of claim 19, wherein the liquid-core waveguide is disposed on a substrate less than or equal to 2 cm in width and less than or equal to 2 cm in length.

22. The particle detection system of claim 21, wherein the light source is disposed on the substrate.

23. The particle detection system of claim 21, wherein the detector is disposed on the substrate.

\* \* \* \* \*